US010282149B2

(12) United States Patent
Van Vliembergen et al.

(10) Patent No.: US 10,282,149 B2
(45) Date of Patent: May 7, 2019

(54) ROLL-FED PRINTING APPARATUS, SOFTWARE MEDIUM, AND METHOD FOR CONTROLLING A ROLL-FED PRINTING APPARATUS

(71) Applicant: Océ Holding B.V., Venlo (NL)

(72) Inventors: Eduardus J. W. Van Vliembergen, Venlo (NL); Elsemieke P. A. Van Rossum, Venlo (NL)

(73) Assignee: OCÉ HOLDING B.V., Venlo (NL)

( * ) Notice: Subject to any disclaimer, the term of this patent is extended or adjusted under 35 U.S.C. 154(b) by 0 days.

(21) Appl. No.: 16/052,072

(22) Filed: Aug. 1, 2018

(65) Prior Publication Data
US 2019/0050181 A1    Feb. 14, 2019

(30) Foreign Application Priority Data

Aug. 9, 2017    (EP) .................................... 17185569

(51) Int. Cl.
*G06F 3/12* (2006.01)
*H04N 1/60* (2006.01)

(52) U.S. Cl.
CPC .......... *G06F 3/1251* (2013.01); *G06F 3/1203* (2013.01); *G06F 3/126* (2013.01); *G06F 3/1273* (2013.01)

(58) Field of Classification Search
None
See application file for complete search history.

(56) References Cited

U.S. PATENT DOCUMENTS

| 2002/0101492 | A1* | 8/2002 | Hierro | ................... B41J 11/0005 347/104 |
| 2009/0027433 | A1* | 1/2009 | Van De Wynckel | ........................ B41J 2/2135 347/12 |
| 2009/0231374 | A1* | 9/2009 | Van de Wynckel | ... B41J 2/2135 347/12 |
| 2013/0162715 | A1* | 6/2013 | Tombs | ................... B41J 2/2132 347/19 |

(Continued)

FOREIGN PATENT DOCUMENTS

EP    2 857 955 A1    4/2015

OTHER PUBLICATIONS

European Search Report issued for European Application No. 17185569, completed on Feb. 5, 2018.

*Primary Examiner* — Anh-Vinh T Nguyen
(74) *Attorney, Agent, or Firm* — Birch, Stewart, Kolasch & Birch, LLP

(57) ABSTRACT

A roll-fed printing apparatus and a method for controlling a roll-fed printing apparatus for printing images on at least one recording medium from an image queue. A part of the image queue is saved. The part comprises the ripped images at established arbitrary positions on the roll of medium and events according to a plurality of event image objects placed in the image queue into a roll file which is stored in a history roll queue storage of the controller. At least part of the ripped images saved in the roll file are reprinted on a new roll of medium having a same roll width as the arbitrary roll width according to a sequence order and the arbitrary positions saved in the roll file. During reprinting, the corresponding events saved in the roll file are executed.

12 Claims, 11 Drawing Sheets

(56) References Cited

U.S. PATENT DOCUMENTS

| | | | |
|---|---|---|---|
| 2014/0063513 A1* | 3/2014 | Enge | G06K 15/1868 358/1.8 |
| 2015/0170011 A1 | 6/2015 | Hattori | |
| 2018/0170077 A1* | 6/2018 | Nistor | B02C 18/00 |
| 2018/0203654 A1* | 7/2018 | Schenk | G06F 3/1211 |
| 2018/0373968 A1* | 12/2018 | Bakker | B41J 11/002 |
| 2019/0018627 A1* | 1/2019 | Van Vliembergen | G06F 3/1219 |
| 2019/0018630 A1* | 1/2019 | Van Vliembergen | G06F 3/1251 |

\* cited by examiner

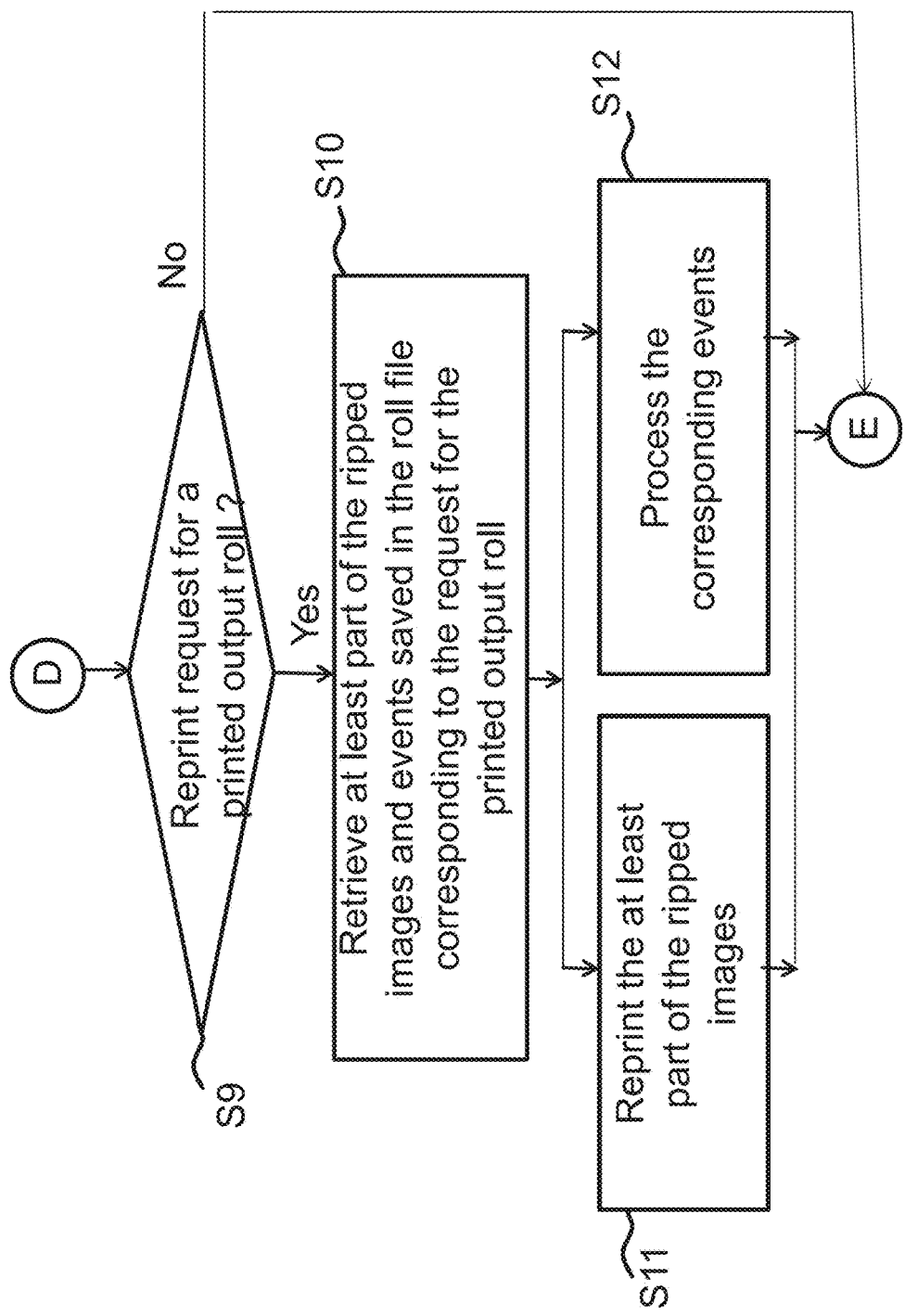

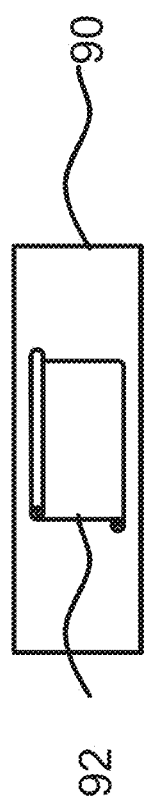

ROLL-FED PRINTING APPARATUS, SOFTWARE MEDIUM, AND METHOD FOR CONTROLLING A ROLL-FED PRINTING APPARATUS

FIELD OF THE INVENTION

The present invention generally pertains to a roll-fed printing apparatus, such as a roll-to-roll inkjet printing apparatus, for printing images on a recording medium such as paper. The invention also pertains to a non-transitory software medium comprising executable code configured to, when executed, perform a method for controlling a roll-fed printing apparatus. The invention also pertains to a method for controlling a roll-fed printing apparatus for printing images on a roll of recording medium having an arbitrary roll width, the roll-fed apparatus comprising a print engine, a controller comprising a roll managing system for managing the printing of ripped images on the roll of recording medium, the method comprising the steps of the controller receiving a plurality of ripped images from a raster image processor into memory of the roll managing system, for each ripped image the roll managing system establishing an arbitrary position in an X direction and a Y direction of the plane of the recording medium of the roll at which arbitrary position the ripped image is intended to be printed, the controller creating subsequent image swathes for printing the ripped images according to the established arbitrary positions of the ripped images, the roll managing system displaying and maintaining an image queue area comprising representations of the planned ripped images to be printed on the roll of recording medium and representations of the ripped images currently being printed on the roll of recording medium, the roll managing system providing a plurality of event image objects which are placeable in the image queue area and the image queue area is configured to receive an event image object of the plurality of event image objects between the representations of the planned ripped images to be printed on the roll of recording medium in the image queue area, and the controller setting for an event image object of the plurality at least one printing and/or finishing command to be executed by the printing apparatus in accordance with a timing sequence of printing of the ripped images displayed in the image queue area, and the print engine subsequently printing the created subsequent image swathes and executing the events according to the set at least one printing and/or finishing command.

The X and Y direction in the plane of the recording medium of the roll correspond to a length and a width of the recording medium of the roll.

BACKGROUND ART

Roll-fed printers are a well-known type of printers. In roll-fed printers, a recording medium such as paper is wound up on an input roll and then fed into, and guided along, a path through the printer, unwinding the input roll by and by along the process. In this way, the recording medium is roll-fed (i.e. taken from a roll and fed) to a marking unit of the printer which applies a marking material (prints) onto the recording medium Roll-to-roll printers are a common type of roll-fed printers and are characterized in that the recording medium is, after images have been printed on it, wound up on an output holder of an output roll by and by along the process.

Some roll-fed printers comprise a cutting unit, i.e. a cutter, being configured to cut the recording medium after images have been printed on it such that the printer does not output the entire contiguous recording medium but instead cut pieces of it.

Some roll-fed printers comprise a laminating unit, i.e. a laminator, being configured to laminate the recording medium after images have been printed on it such that the robustness of the printed images is increased.

Roll-fed printers are very efficient devices for forming a large number of images requiring a large amount of the recording medium, as the wound-up input rolls are comparatively easy to handle by both the printers and their operating personnel. Accordingly, little or no supervision by personnel is needed for roll-fed printers, especially for roll-to-roll printers, as the marked recording medium is automatically stored on the output roll.

An event image object is defined as a digital object which is a user operable element. The digital object comprises a digital image, for example a thumbnail image, an icon, a text image or any other representable image. The image represents an event which may be an operator event or an apparatus event.

By allowing the operator to plan interventions by means of the event image objects, an image quality of the printed images and a production progress on the roll-fed printing apparatus may increase. The operator is allowed to drag event image objects to the image queue area. These event image objects may be planned in the print queue, i.e. these event image objects may be planned in between the digital representations of the ripped images.

Such an event image object may be dragged and dropped towards any position in the image queue area at any preferable moment. The result—what moment in time this intervention or warning will take place—is visible in the image queue area.

Reprinting of an image is quite common in the field of printing. However, reprinting an entire roll at once is not common in the field of printing. If there is a problem with print quality, this problem often affects the entire roll. The user has to plan the complete roll again with all its ripped images and its event image objects and finishing actions. In addition, when the problem does not affect the whole roll, an unadapted reprint of the roll may contain superfluous printed images which were already correctly printed at the first time. In case that the problem does not affect the whole roll, it usually concerns an area of the roll that contains more than one image.

It is desirable to have a method for controlling a roll-fed printing apparatus in a productive way that enables an operator of the roll-fed printing apparatus to be more flexible when reprinting an entire roll. It is also desirable to have a roll-fed printing apparatus capable of executing such a method.

SUMMARY OF THE INVENTION

Thereto the method of the invention comprises the steps of saving a part of the image queue, the part comprising the ripped images at the established arbitrary positions in an X direction and a Y direction on the roll of medium and the events according to the plurality of event image objects placed in the image queue into a roll file to be stored in a history roll queue storage of the controller, and reprinting at least part of the ripped images saved in the roll file on a new roll of medium having a same roll width as the arbitrary roll width according to a sequence order and the arbitrary positions saved in the roll file, and during reprinting, executing the corresponding events saved in the roll file.

According to an embodiment the method comprises a step of determining a first moment in time during printing the roll of recording medium, and establishing the at least part of the ripped images intended to be reprinted to be ripped images which have been printed on the roll of recording medium from the first moment in time.

According to an embodiment the method comprises a step of determining a second moment in time during printing the roll of recording medium, and establishing the at least part of the ripped images intended to be reprinted to be ripped images which have been printed on the roll of recording medium until the second moment in time.

According to an embodiment the event image object represents one out of an unprinted space event, an inspection moment, a print pause, a roll change, a maintenance action and a finishing action. Being able to plan an unprinted space event, an inspection moment, a print pause, a roll change, a maintenance action and/or a finishing action ample before printing, the operator is empowered to plan these events whenever he prefers to execute the events. The events represented by the event image objects may be manually or automatic events.

According to an embodiment the method comprises the steps of the roll managing system displaying and maintaining a dynamic roll preview area comprising a digital representation of the roll of recording medium, digital representations of the planned ripped images to be printed on the roll of recording medium, digital representations of the ripped images currently being printed on the roll of recording medium, and digital representations of each event image object placed in the image queue area, and the roll managing system continuously synchronizing the dynamic roll preview area with the image queue area.

According to an embodiment the method comprises the steps of manually scrolling through the digital representations of the ripped images of the dynamic roll preview area or the image queue area, and simultaneously automatically scrolling through the corresponding digital representations of the ripped images in the image queue area or the dynamic roll preview area respectively, while both scrolling steps are used to determine the first moment in time.

According to an embodiment the method comprises the steps of manually scrolling through the digital representations of the ripped images of the dynamic roll preview area or the image queue area, and simultaneously automatically scrolling through the corresponding digital representations of the ripped images in the image queue area or the dynamic roll preview area respectively, while both scrolling steps are used to determine the second moment in time.

According to an embodiment the method comprises the steps of manually selecting a digital representation of a ripped image in the dynamic roll preview area or the image queue area, and simultaneously automatically selecting a corresponding digital representation of the ripped image in the image queue area or the dynamic roll preview area respectively, while both selecting steps are used to determine the first moment in time.

According to an embodiment the method comprises the steps of manually selecting a digital representation of a ripped image in the dynamic roll preview area or the image queue area, and simultaneously automatically selecting a corresponding digital representation of the ripped image in the image queue area or the dynamic roll preview area respectively, while both selecting steps are used to determine the second moment in time.

According to an embodiment the method comprises the step of excluding at least one event saved in the roll file from execution during reprinting of the at least part of the ripped images saved in the roll file.

The invention also relates to a roll-fed printing apparatus for printing images on a roll of recording medium having an arbitrary roll width, the roll-fed apparatus comprising a print engine and a controller comprising a roll managing system for managing the printing of ripped images on the roll of recording medium, the controller being configured to control a print queue comprising the ripped images to be printed, wherein the controller is configured to receive a plurality of ripped images from a raster image processor into memory of the roll managing system, the roll managing system is configured to establish for each ripped image an arbitrary position in an X direction and a Y direction of the plane of the roll of recording medium at which arbitrary position the ripped image is intended to be printed, the controller is configured to create subsequent image swathes for printing the ripped images according to the established arbitrary positions of the ripped images, the print engine is configured to subsequently print the created subsequent image swathes, and the roll managing system is configured to display and maintain an image queue area comprising the planned ripped images to be printed on the at least one recording medium and the ripped images currently being printed on the roll of recording medium, and to provide a plurality of event image objects which are placeable in the image queue area and the image queue area is configured to receive an event image object of the plurality of event image objects between the planned ripped images to be printed on the roll of recording medium in the image queue area, the controller is configured to set for an event image object of the plurality at least one printing and/or finishing command to be executed by the printing apparatus in accordance with a timing sequence of printing of the print jobs displayed in the image queue area, wherein the controller comprises a history roll queue storage being configured to save a part of the image queue, the part comprising the ripped images at the established arbitrary positions in an X direction and a Y direction on the roll of recording medium and the events according to plurality of event image objects placed in the image queue into a roll file in order to facilitate a reprinting of at least part of the ripped images saved in the roll file on a new roll of medium having a same roll width as the arbitrary roll width according to a sequence order and the arbitrary positions saved in the roll file, and, during reprinting, an execution of the corresponding events saved in the roll file.

The invention also relates to a non-transitory software medium comprising executable code configured to, when executed, perform the method according to the invention.

The term "printing" is used herein as a general term for any marking of a recording medium with any marking material. As a synonym, the term "image forming" may be used. Recording mediums may comprise paper, flexible plastic, metal foils, textiles and so on. Marking materials may comprise ink, metal, varnish, toner and so on. "Marking" may be any process by which the marking material is applied to the recording medium.

The term "successfully printed" may be synonymous with "completely printed". The term may, however, comprise additional criteria, for example the criterion that the ripped image has been formed on the recording medium exactly as was intended by the data characterizing said print job, e.g. all pixels of the bitmap characterizing that ripped image are exactly reproduced on the recording medium. Another possible criterion for a "successfully printed" ripped image may be that the ripped image has been printed exactly at the position of the recording medium intended for it. Depending on the used recording medium and the used marking material, an additional criterion for a "successfully printed" ripped image may be that the ripped image has been printed with a certain thickness on the recording medium, e.g. when an integrated circuit is printed in metal.

Additional advantages, and the solution of additional problems, will be apparent from the subject-matter of the dependent claims as well as from the description and the drawings.

The term "marking unit" refers to a structure, a device, or a system, within the roll-fed printing apparatus that performs the actual printing, i.e. the marking of the recording medium with the marking material. For example, the marking unit of an inkjet printing apparatus is an inkjet print head.

"Downstream" herein, and in the following, is applicable to positions that are reached later by the recording medium moving along the intended path starting from an input roll of the roll-fed printing apparatus than positions "upstream". For example, the marking unit (e.g. an inkjet print head of an inkjet printing apparatus) is arranged downstream of the input roll.

BRIEF DESCRIPTION OF THE DRAWINGS

The present invention will become more fully understood from the detailed description given herein-below and the accompanying schematic drawings which are given by way of illustration only, and thus are not limitative of the present invention, and wherein:

FIG. 8-10 show a schematic flow diagram illustrating a method according to an embodiment of the invention; and FIG. 11 schematically shows a non-transitory software medium according to an embodiment of the invention.

DETAILED DESCRIPTION OF THE DRAWINGS

Figure 1:
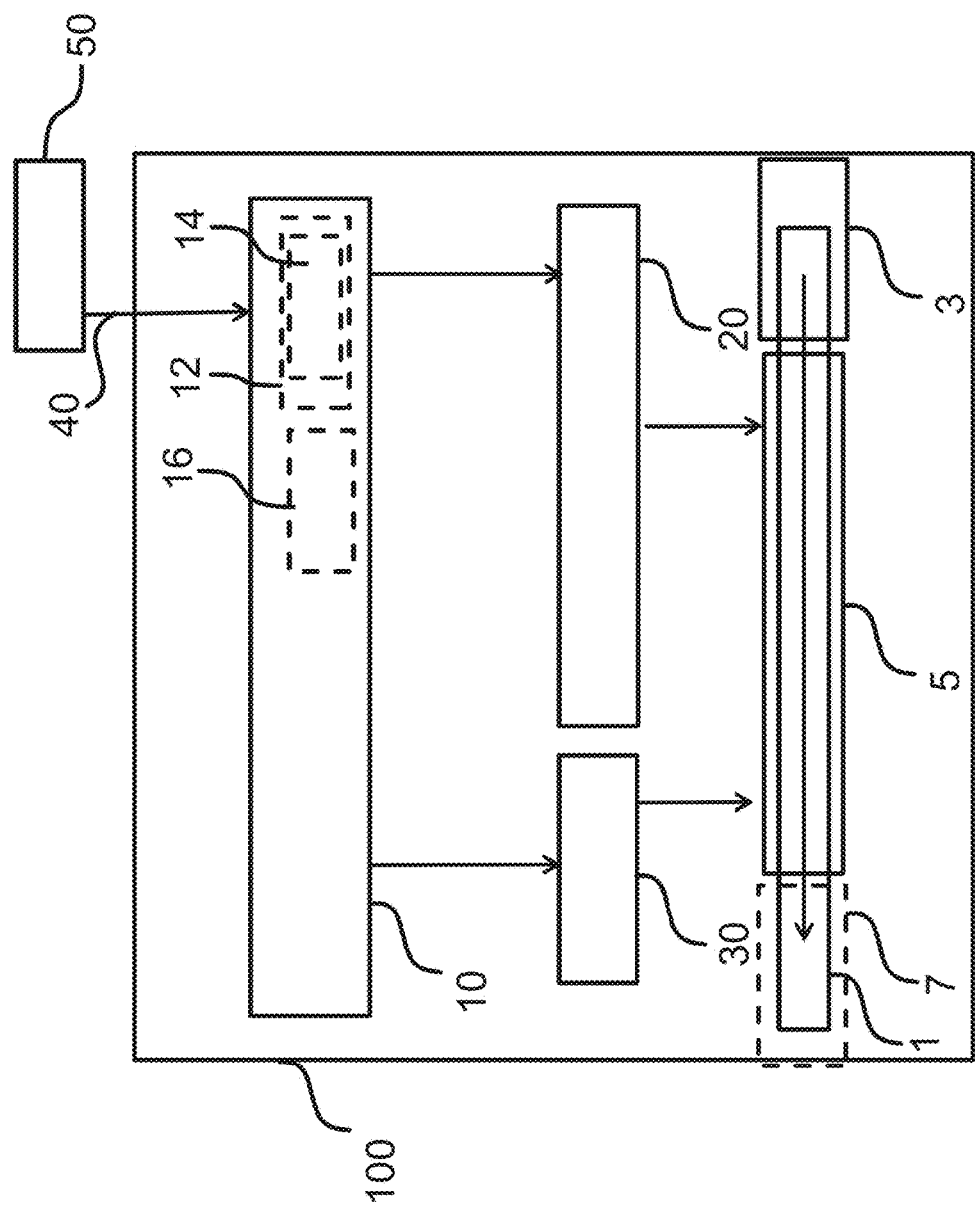
FIG. 1-2 schematically show roll-fed printing apparatuses according to embodiments of the invention.

The present invention will now be described with reference to the accompanying drawings, wherein the same reference numerals have been used to identify the same or similar elements throughout the several views, and in some instances throughout the several embodiments.

FIG. 1 schematically shows a roll-fed printing apparatus 100 according to an embodiment. For the following detailed description, reference will also be made to depictions and reference signs in following FIG. 2-4 which may better illustrate the function of the roll-fed printing apparatus 100 in general and a controller 10 comprising a roll managing system 12 in particular. The controller 10 also comprises a history roll queue storage 16 according to the invention for storing a part of the image queue. The part comprises a roll file containing the ripped images at the established arbitrary positions in an X direction and a Y direction on the roll of medium and the events according to the plurality of event image objects placed in the image queue. The history roll queue storage 16 is read out later for reprinting at least part of the ripped images saved in the roll file on a new roll of medium having a same roll width as the arbitrary roll width according to a sequence order and the arbitrary positions saved in the roll file. During reprinting the corresponding events saved in the roll file are executed.

In the roll-fed printing apparatus 100, recording medium 1 is initially wound up on an input roll 3 and is there-from guided, by and by, along a path 5 of the roll-fed printing apparatus 100. If the roll-fed printing apparatus 100 is, specifically, a roll-to-roll inkjet printing apparatus, then the roll-to-roll inkjet printing apparatus may additionally comprise an output roll 7 onto which the recording medium 1 is wound, by and by, after it has been marked according to a print job. The path 5 comprises actors and other components to move, and guide, the recording medium 1 along.

The roll-fed printing apparatus 100 comprises a print engine 20 configured to mark the recording medium 1, using a marking material, in accordance with specifications of the image to be printed. A large number of individual ripped images to be printed may be submitted to the roll-fed printing apparatus 100.

For creating the printed roll, at least one gathering criterion is applied. The at least one gathering criterion may comprise a criterion that the individual ripped images shall be created such that as many of the individual ripped images are able to be printed before a specific resource of, or available to, the roll-fed printing apparatus 100 is depleted to a certain amount or percentage. The percentage may, for example, be zero percent.

The percentage may alternatively be set to a larger percentage than zero, for example, 5% (five percent). In that way, possible errors in the determination, or prediction, of the remaining amount of that resource are taken into account and it is made sure that the last individual ripped images printed are actually printed while the specific resource is still undepleted. For example, it may be undesirable to print until ink is depleted down to zero percent as, at very low ink levels, the printing results and/or the reliability of an ink level estimation may vary.

In the case that more than one gathering criteria are applied, the percentages for all of the criteria may be equal, e.g. zero. There may also be a different percentage set for each, or for a number of, the applied gathering criteria.

The specific resource may be at least one of time, marking material, and the recording medium 1. For roll-fed or roll-to-roll inkjet printing apparatus, for example, the specific resource may be at least one of time, ink, and remaining recording medium upstream of a print head of the inkjet printing apparatus.

A printer controller 10 of the roll-fed printing apparatus 100 is configured to control the roll-fed printing apparatus 100, as will be described in more detail in the following.

The controller 10 comprises the roll managing system 12 for managing the printing of ripped images on the recording medium 1.

The controller 10 is able to receive a plurality of ripped images from an external and independent raster image processor 50 via a digital network connection 40 in memory 14 of the roll managing system 12 irrespectively of the presence of the appropriate recording medium in the roll-fed printing apparatus 100. An appropriate recording medium is for example the recording medium specified for the images to be printed. The receipt of the plurality of ripped images may also be irrespectively of the readiness of the printer, i.e. the printer may still be printing other images.

For each ripped image the roll managing system 12 is configured to establish an arbitrary position in an X direction and a Y direction in the plane of the recording medium 1 at which arbitrary position the ripped image is intended to be printed, The controller 10 is configured to create subsequent image swathes for printing the ripped images according to the established arbitrary positions of the ripped images. The print engine 20 subsequently prints the created subsequent image swathes.

The roll managing system 12 monitors a first actual status of printing of the created subsequent image swathes, a second actual status of a timing of the ripped images to be printed and a third actual status of the recording medium 1.

The roll managing system 12 is configured to display and keeping up-to-date a dynamic roll preview area representing the at least one recording medium, the planned ripped images to be printed on the at least one recording medium, the ripped images currently being printed on the at least one recording medium and image items representing the monitored first, second and third actual statuses. The dynamic roll preview area will be further elucidated hereinafter in FIG. 4.

According to another embodiment the raster image processor 50 receives from the roll-fed printing apparatus 100 the first actual status of printing of created subsequent image swathes, the second actual status of a timing of the ripped images to be printed and the third actual status of the at least one recording medium loaded in the roll-fed printing apparatus 100. These three actual statuses are used by the raster image processor 50 to keep up-to-date a dynamic roll preview area to be displayed on a user interface (not shown) connected to the raster image processor 50 based on the first actual status, the second actual status and the third actual status. Such a user interface may contain a window like the window shown in FIG. 4. The user interface may be a cloud user interface which is connected via a network to the raster image processor 50 and the roll-fed printing apparatus 100. According to a further embodiment the roll managing system 12 is situated in the raster image processor instead of in the roll-fed printing apparatus 100.

The controller 10 may further be configured to control a component of the printing apparatus 100 arranged downstream of the print engine 20 of the printing apparatus 100.

The controlled component may, e.g., be a cutting unit, i.e. a cutter, being configured to cut the recording medium 1 according to given cut paths or commands entered by the operator or indicated in a user interface window of the roll managing system 12. That controlled component may e.g. also be a laminating unit 30 for laminating the recording medium 1.

Figure 2:
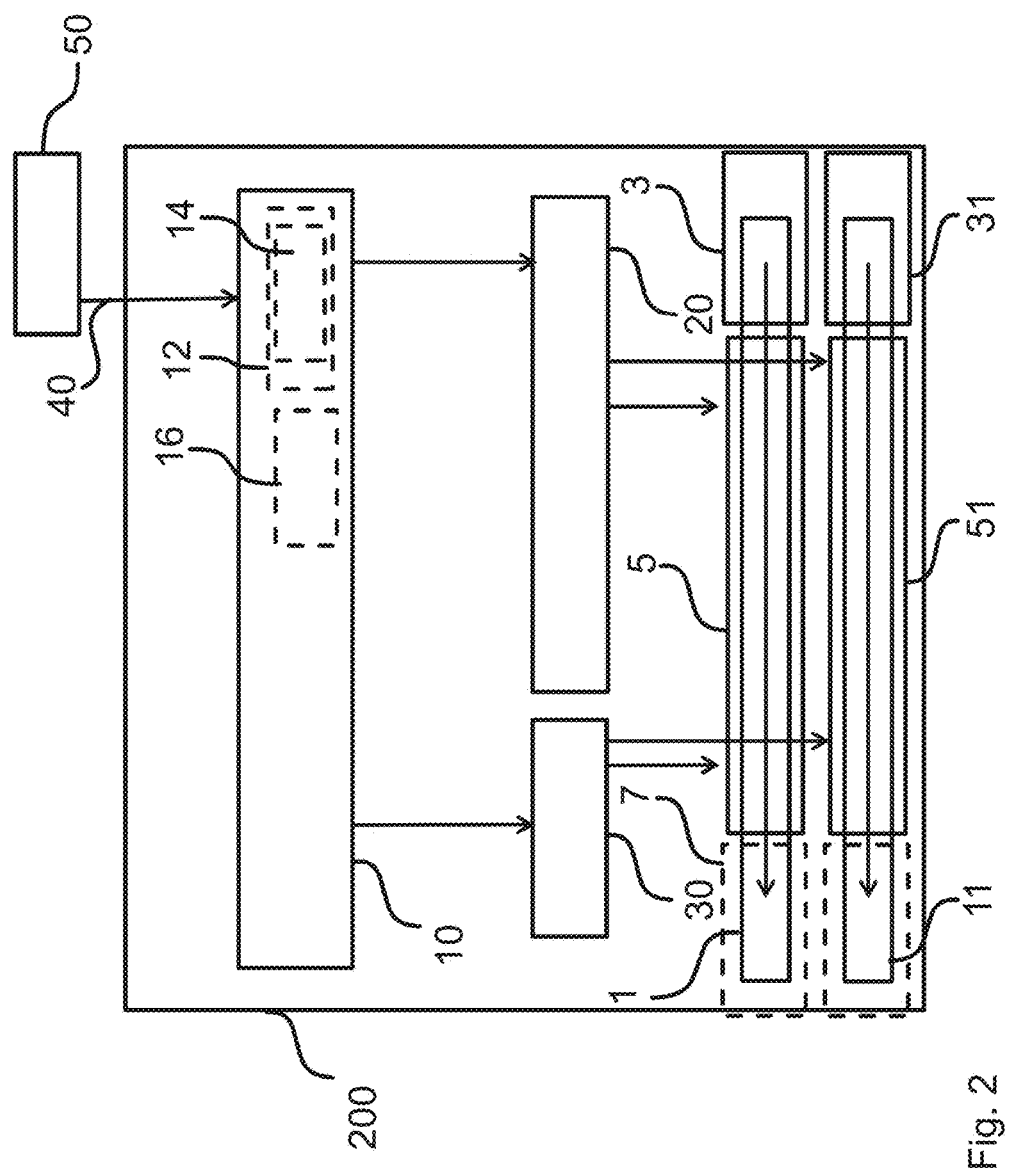

FIG. 2 shows another embodiment of a roll-fed printing apparatus 200 according to the invention. The roll-fed printing apparatus 200 comprises a feeder for feeding both a first recording medium 1 and a second recording medium 11 from a first input roll 3 and a second input roll 31 respectively simultaneously to the print engine 20.

In the roll-fed printing apparatus 100, the first recording medium 1 and the second recording medium 11 are initially wound up on the first input roll 3 and the second input roll 31 respectively, and are there-from guided, by and by, along a first path 5 and a second path 51 of the roll-fed printing apparatus 200 respectively.

If the roll-fed printing apparatus 200 is, specifically, a roll-to-roll inkjet printing apparatus, then the roll-to-roll inkjet printing apparatus may additionally comprise a first output roll 7 onto which the recording medium 1 is wound, by and by, after it has been marked according to a ripped image. The roll-to-roll inkjet printing apparatus may additionally comprise a second output roll 71 onto which the recording medium 11 is wound, by and by, after it has been marked according to a ripped image.

Figure 3:
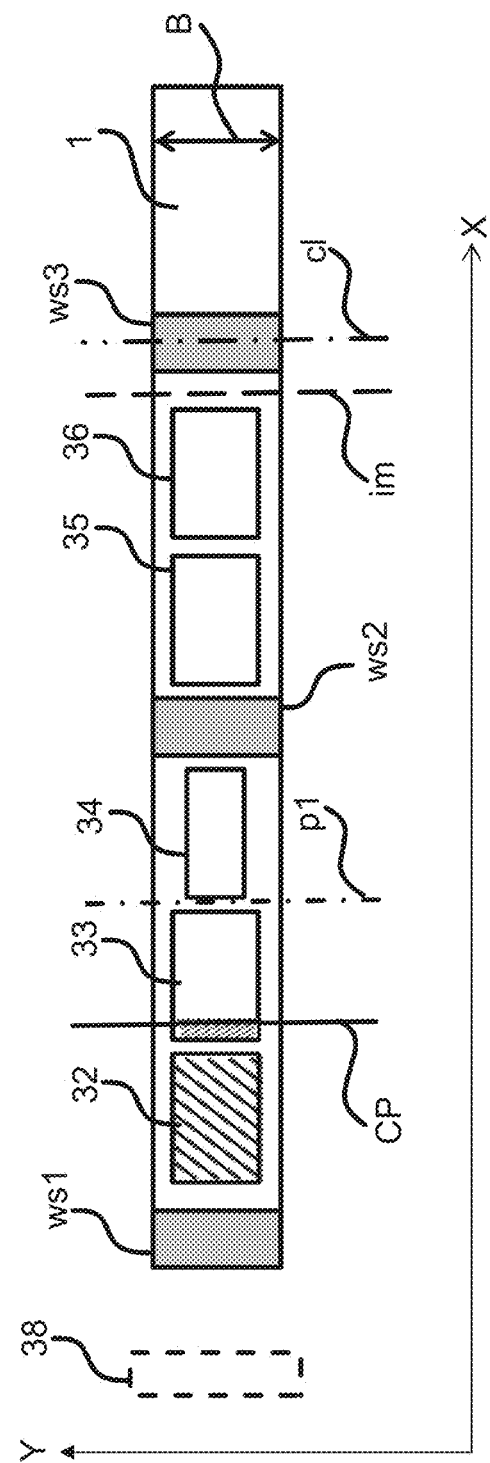
FIG. 3 schematically shows a view of a recording medium for illustrating the function of the roll-fed printing apparatus of FIG. 1 as well as the method of FIG. 5 according to the invention.
Figure 5:
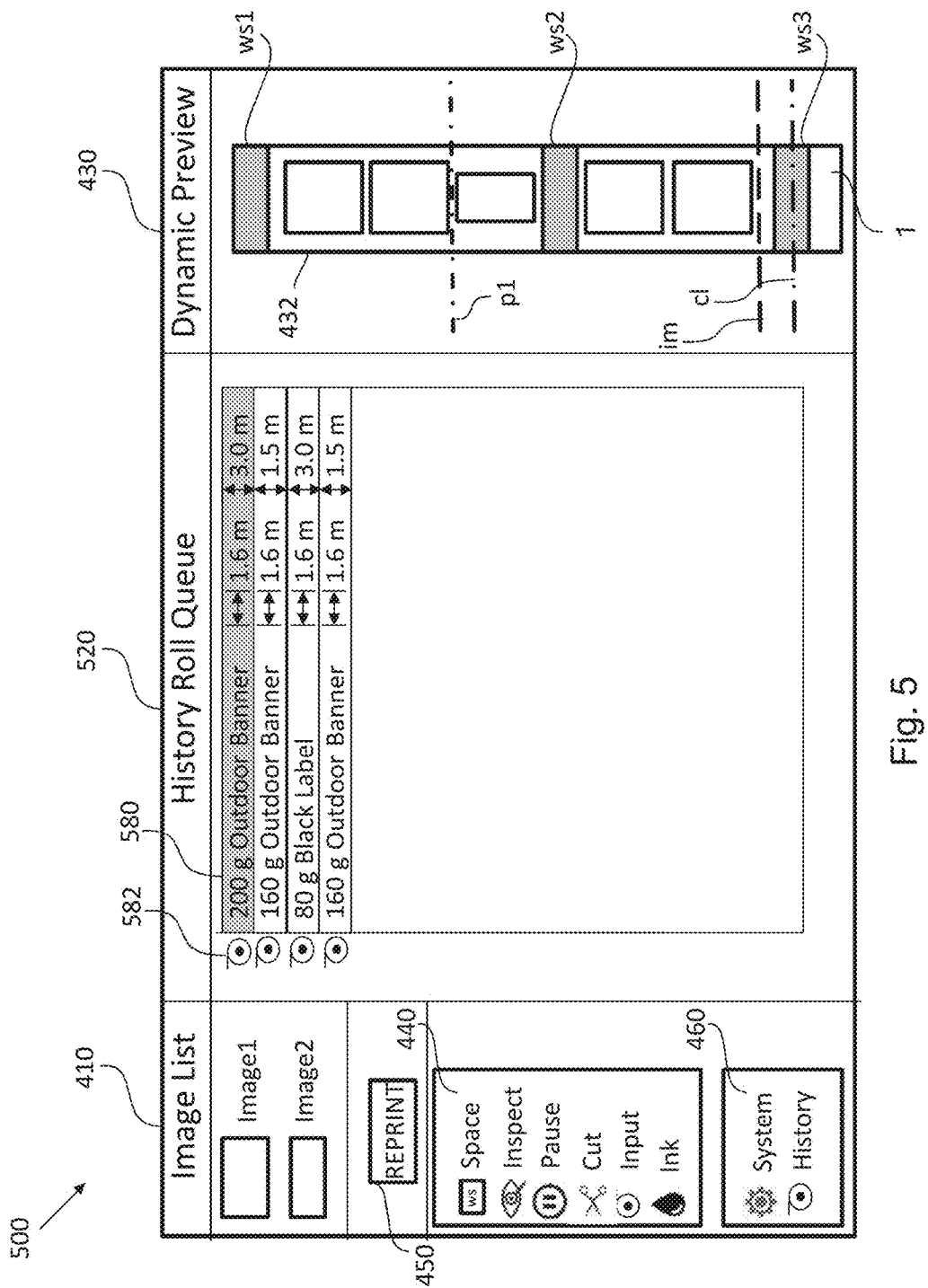
Figure 6:
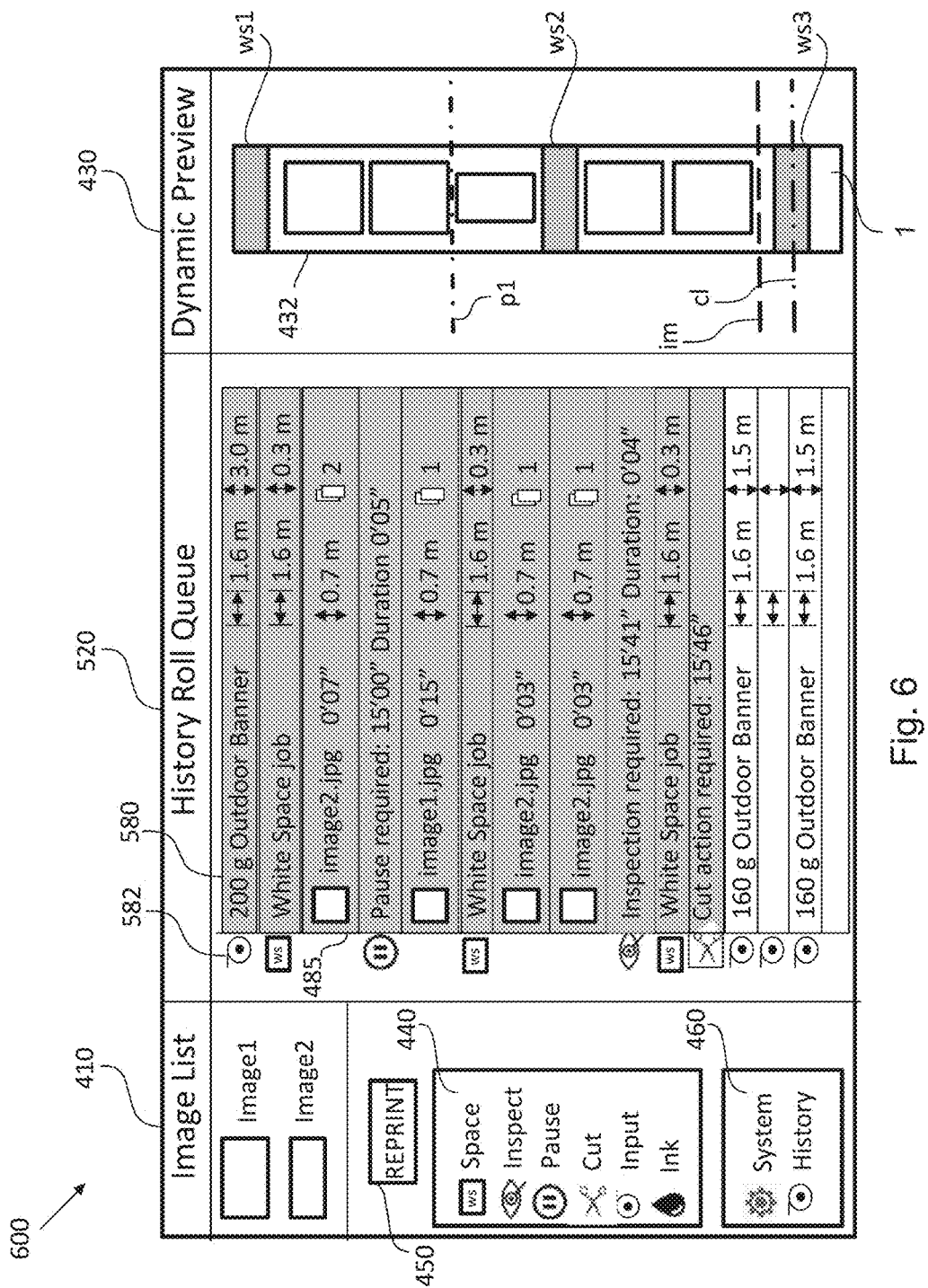

FIG. 3 schematically shows a view of a recording medium 1 for illustrating the function of the roll-fed printing apparatus of FIG. 1 according to the invention as well as for illustrating the method of FIG. 5-6 according to the invention.

In FIG. 3, a vertical line symbolizes a current position CP of the print head within the individual ripped images. The individual ripped images may be positioned at arbitrary positions in a direction X and in a direction Y on the recording medium 1. Regarding the following discussion, it is assumed that the current position CP corresponds to a location along the length of the recording medium 1 at which the print engine 20 is arranged to mark the recording medium 1 currently. Furthermore the print engine 20 may be a print head moving along the breadth B of the recording medium 1 in reciprocation along a scanning direction. By moving in reciprocation marking material are deposited on the recording medium 1 in swathes.

All parts of the individual ripped images that are positioned to the left (i.e. downstream) of the current position CP (these parts are shown as hatched in FIG. 3) have been printed; all parts of the individual ripped images that are positioned to the right (i.e. upstream) of the current position CP (these parts are shown as un-hatched rectangles in FIG. 3) have not yet been printed.

Figure 4:
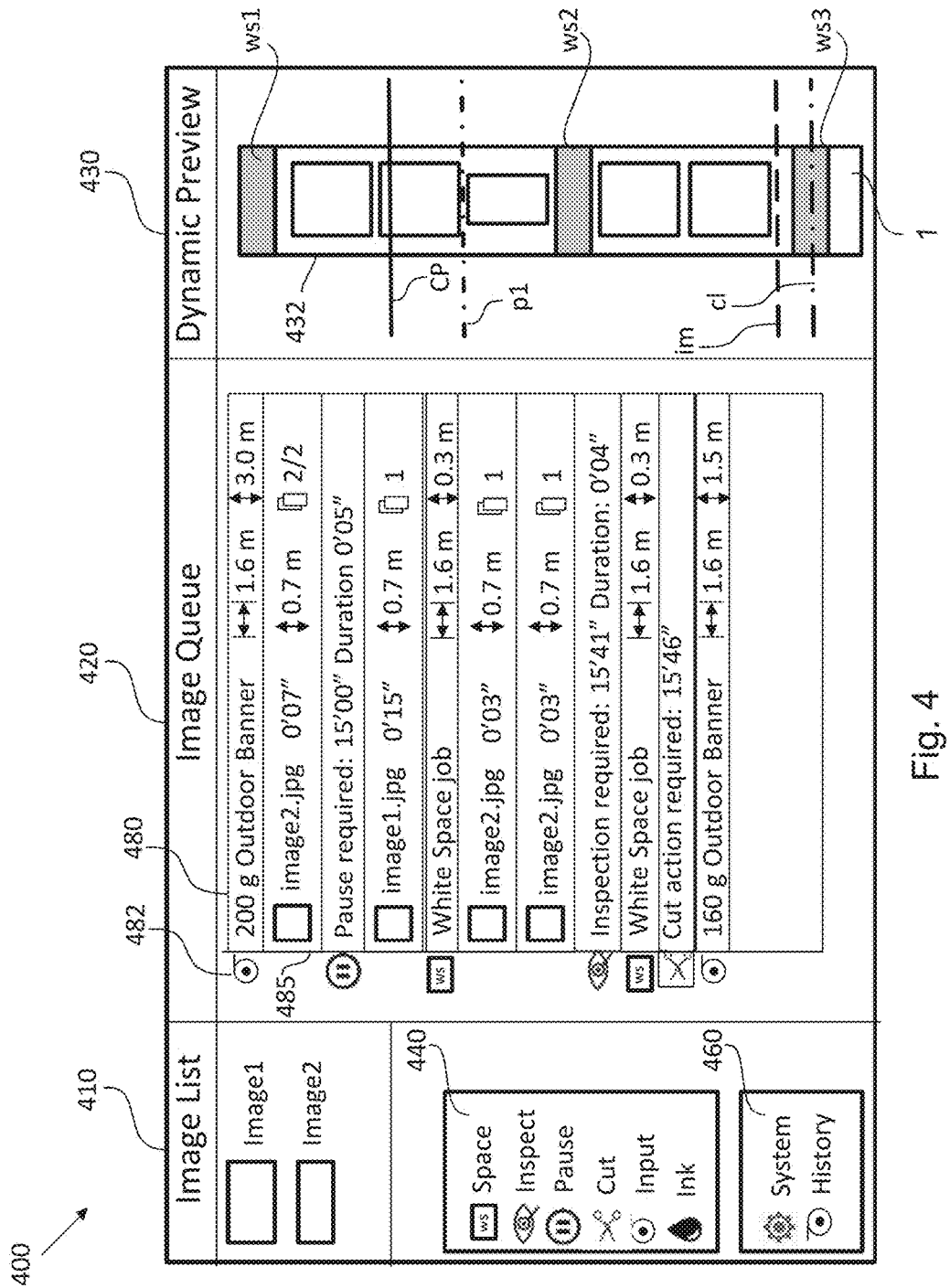
FIG. 4-7 schematically show views of user interface windows of a roll planning system according to the invention.

The terms "downstream" and "upstream" are used here with respect to the representation of the six images on the dynamic roll preview area 430 in FIG. 4 (instead of with respect to the recording medium 1) in the sense that an upstream direction can be designated for the representations of the six images as the direction that would be upstream for the recording medium 1, and equally for the downstream direction.

It is evident from FIG. 3 that the individual ripped image 32 has been completely printed. The individual ripped images 34-36 have not yet been printed even partially. The individual ripped image 33 is intersected by the current position CP such that each consists of a portion that has already been printed, and a portion that has not yet been printed. Accordingly, the individual ripped image 33 has not been printed completely (only partially).

According to the invention examples of events are presented in the recording medium 1 such as white spaces ws1, ws2, ws3, a pause p1, an inspection moment im, and a cut line cl.

A white space ws1, ws2, ws3 may be determined by an amount x of millimeters that the recording medium 1 is moved relative to the print mechanism without any printing over x millimeters of the recording medium 1. The white space introduces the possibility for the operator to pause the printing process for that moment.

The inspection moment im relates to an alert that will be given to the operator at a certain moment in time to come back to the roll-fed printing apparatus 100 to inspect for instance print quality.

A pause action is a well-known action as an immediate pause which is presented by means of the local user interface of the roll-fed printing apparatus. The pause p1 according to the invention is different, since the operator is now allowed to plan the pause beforehand in the image queue area or the dynamic roll preview area.

Nevertheless a pause may also be defined without a duration. In that case, printing is resumed on manual indication of the operator.

A cut action is also a well-known action as an immediate cut action which is presented by means of the local user interface of the roll-fed printing apparatus 100. The cut action cl according to the invention is different, since the operator is now allowed to plan the cut action beforehand in the image queue area or the dynamic roll preview area.

In FIG. 3 the additional white space action ws1 has already been performed. The white space ws1 is a non-printing job during execution of which the recording medium 1 has been moved relative to the print mechanism without any printing over an area which corresponds to the specified length and width B. The white space actions ws2, ws3 still have to be processed.

In FIG. 3 the pause moment p1, the inspection moment im, and the cut line cl are presented by vertical lines each having another dashing in order to distinguish these planned events from each other.

In FIG. 3 a cutting device, i.e. a cutter, is represented downstream of the recording medium 1 by a dashed rectangle 38.

FIG. 4 shows an example of a user interface window 400 controlled by the roll managing system 12. The user interface window 400 comprises an image queue area 420, a dynamic roll preview area 430, a specification area 440 and a navigation area 460.

The specification area 440 is configured to list event image objects which can be planned as operator actions or roll-fed printing apparatus actions in the image queue area 420 and/or the dynamic roll preview area 430. The event image objects represent a white space action ("Space"), an inspection moment ("Inspect"), a pause ("Pause"), a cut ("Cut"), a roll change ("Input") and an ink fill moment ("Ink"). The event image objects may be dragged and dropped onto the image queue area 420 or the dynamic roll preview area 430.

The navigation area 460 comprises a link to the history roll queue ("History") and a link to the system settings ("System") of the roll-fed printing apparatus 100.

According to the example the user interface window 400 comprises an image list area 410. Note that the image list area 410 is not necessary when the ripped images are received by the controller 10 and automatically added to the image queue represented in the images queue area 420. The image list area 410 comprises images 1-2 which may be dragged and dropped in the image queue area 420 or in the dynamic roll preview area 430.

When an image is dropped in the image queue area 420, the dynamic roll preview area 430 will be automatically updated by adding a representation of the image to the preview 432 of the roll in the dynamic roll preview area 430. When an image is dropped in the dynamic roll preview area 430, the image queue area 420 will be automatically updated by adding a representation of the image to the image queue in the image queue area 420. In other words the image queue area 420 and the dynamic roll preview area 430 are continuously synchronized with respect to updates of images.

When an event image object is dropped in the image queue area 420, the dynamic roll preview area 430 will be automatically updated by adding a representation of the event image object to the preview 432 of the roll in the dynamic roll preview area 430. When an event image object is dropped in the dynamic roll preview area 430, the image queue area 420 will be automatically updated by adding a representation of the event image object to the image queue in the image queue area 420. In other words the image queue area 420 and the dynamic roll preview area 430 are continuously synchronized with respect to updates of event image objects.

In the example in FIG. 4 image2—which corresponds to the image 22 in FIG. 3—has already been printed and is not visible any more in the image queue area 420. Image2 is currently being printed for a second time according to the specifications of the image2. The recording medium 1 on which image2 is currently being printed is indicated by a recording medium line 480 in the image queue area 420. The image recording medium line 480 shows the type of recording medium, for example "200 g Outdoor Banner", the width of the recording medium, for example 1.6 m., and the roll length currently planned to be printed plus the already printed roll length of the recording medium, for example 1.5 m. The currently planned length or the currently remaining length may be at least part of an indication for an actual status of the recording medium 1.

Image2—which corresponds to the images 22, 23, 25, 26 in FIG. 3—is represented in the image queue area 420 by means of image lines 485. The image lines 485 comprise an identification of the image, for example a corresponding thumbnail and a name "image2.jpg", a time left to print the complete image2, for example 7 minutes, a length piece of the recording medium which is occupied by the image2 when printed, for example 1.5 m., and an indication of the number of copies of the image2 to be printed, for example 2 copies.

The image queue area 420 also comprises the event image objects for example as icons 482 corresponding to the event image object icons shown in the specification area 440 just before the corresponding line in the image queue area 420. Such a line may comprise an indication for a required action like a cutting action, a first time indication when the action has to be executed, for example 15 h 46 m, or a second time indication how long the action will last. It is noted that after the cutting action at 15 h 46 the same roll will be input in the roll-fed printing apparatus 100 as indicated by a recording medium line indicating a recording medium type of "200 g Outdoor Banner".

The image queue area 420 comprises white space event lines corresponding to the white spaces ws2, ws3 in the dynamic roll preview area 430. Also a width and a length of the white space events are specified in the white space event lines in image queue area 420.

The dynamic roll preview area 430 comprises a representation 432 of at least part of the recording medium 1 to be printed upon.

The current position of the print head is reflected in the dynamic preview area 430 by an unbroken line CP. The unbroken line CP corresponds to the current position CP of the print head shown in FIG. 3. The unbroken line CP represents an actual status of printing of the created subsequent image swathes and an actual status of the image events ws1, ws2, ws3, p1, im, cl according to the invention. The image events ws1, ws2, ws3, p1, im, cl in FIG. 4 have different dashing patterns in order to distinguish the image events from each other.

The cutting position corresponding to the cutting action planned at 15h46 m is represented in the dynamic preview area 430 by a dashed line cl. The dashed line cl intersects the white space job representation ws3 in the dynamic preview area 430 as to indicate that the cutting action will take place in the area of the recording medium indicated by the position, the width and the length of the white space job ws3 in the dynamic preview area 430.

According to another embodiment the cutting action c1 is preceded by a white space job, for example numbered as ws3' (not shown) and succeeded by another white space job, for example numbered as ws3" (not shown). The length and the width of the white space job ws3' may be equal to the length and the width of the other white space job ws3" respectively. The sum of the length of the white space job ws3' and the length of the other white space job ws3" may be equal to the length of the white space job ws3 shown in FIG. 4.

The dynamic roll preview area 430 displays the positions in an X direction and a Y direction on the roll at which the images are going to be printed. When an operator wants to change a position of an image to be printed on the recording medium 1, the representation of the image in the dynamic roll preview area 430 may be moved to another (X,Y) position in the dynamic roll preview area 430. The image may be representing a ripped image or an event image object according to the invention. A position of each representation of an image in the dynamic roll preview area 430 is saved to memory 14 in the roll managing system 12 and used by the controller 10 for creation of appropriate swath images derived from the ripped images which is going to be printed by the print engine 20.

When a move of an image in the dynamic roll preview area 430 causes another order of printing the images on the recording medium, the order of the images in the image queue area 420 is automatically adapted.

A new image event may be introduced in the image queue area 420 by dragging an event image object, i.e. an icon in the specification area 440, for example a scissor symbol for a cut, to an appropriate position in the image queue area 420 or to an appropriate position in the dynamic roll preview area 430. In the specification area 440 in FIG. 4 six event image objects are shown, but other kinds of image events may be envisioned and incorporated in the user interface window 400.

A new recording medium line, like a line referenced by reference number 480, may be introduced in the image queue area 420 by dragging a recording medium symbol ("input") in the specification area 440 to an appropriate position in the image queue area 420 or to an appropriate position in the dynamic roll preview area 430. If a width of the new recording medium is deviating from a recording medium are presented in the dynamic roll preview area 430, the width of the new recording medium in the dynamic roll preview area will be automatically adapted upon dropping the recording medium symbol in the image queue area 420 or the dynamic roll preview area 430.

A new white space job line may be manually or automatically introduced in the image queue area 420 by dragging a white space event object from the specification area 440 to the image queue area 420. In the same manner, an inspection job line, a pause line, a cut line, an ink line or a system line may be introduced in the image queue area 420. A new representation of such a new image event is then automatically added at an appropriate position to the dynamic roll preview area 430.

Other kind of event image objects may be manually introduced in the image queue area 420 by dragging the event image object from the specification area 440 to the image queue area 420. Other kind of event image objects may also be automatically introduced in the image queue area 420 by means of a control command of controller 10 or the roll managing system 12 of the roll-fed printing apparatus 100, 200.

A recording medium line according to the invention—like a line referenced by reference number 480—is editable in the image queue area 420 for editing the medium type, the width and the (remaining) length of the recording medium to be represented by the recording medium line.

By indicating a time of an image event in an event image object line in the image queue area 420, the operator can plan and prepare the image event, and he can attend the roll-fed printing apparatus 100 at the indicated time in order to establish a correct image event.

FIG. 3-4 show only one recording medium 1 at a time, but the method may also be applied to the roll-fed printing apparatus 200 shown in FIG. 2 which is a multiple roll printer which is able to print simultaneously on multiple rolls positioned on one common axis or on multiple axes in line with each other. In the latter case the roll preview area comprises a digital visual representation of each roll and a digital representation of a ripped image may be positioned on either roll. The image events may be directed to a total width of a sum of the widths of the multiple rolls and a length which is the same for all multiple rolls. However, an image event may also be introduced for a single roll of the multiple rolls, for example if a white space is only needed for the single roll. For example, a white space event has to be added to one of the multiple rolls in order to add a subsequent common pause extending over both rolls.

A view on the history roll queue according to the invention is introduced in a user interface window 500 shown in FIG. 5. As soon as an entire output roll has been printed, the images and image events corresponding to the entire output roll are saved in the history roll queue storage 16. By selecting the history roll queue symbol ("History") in the navigation area 460, the image queue area 420 shown in FIG. 4 is replaced by a history roll queue area 520 as shown in FIG. 5. The history roll queue area 520 shows an overview of completely printed output rolls 580 in the past. Each completely printed output roll 580 is provided with a history roll icon 582 which deviates from the input roll icon 482 shown in FIG. 4.

Each completely printed output roll 580 may be selected as indicated by the grayed out first row 580 in the history roll queue area 520 in FIG. 5. In the user interface window 500 also a reprint button 450 ("REPRINT") is introduced. By activating the reprint button 450 a selected output roll 580 is scheduled in the image queue area 420 in FIG. 4 to be reprinted with all its corresponding images and image events. A reprint of a roll may also be otherwise activated than by activating the reprint button 450, for example by a right-mouse click on the appropriate history roll icon 582 or the appropriate printed out roll indication 580 in the history roll queue area 520.

By opening the selected output roll 580 in FIG. 5, for example by double clicking on the selected output roll 580, the corresponding images and image events are shown in the history roll queue area 520 as shown in a user interface window 600 in FIG. 6. By default all images and image events which has been executed during the first time printing of the output roll 580, are selected as shown by the grayed out rows in the history roll queue area 520 in FIG. 6. The dynamic preview area 430 shows the roll 1 corresponding to the selected rows in the history roll queue area 520.

In FIG. 6 rows from the grayed out rows in FIG. 6 may be deselected. By doing so, at least part of the ripped images intended to be reprinted, i.e. the ripped images which are selected, are reprinted. For example, when a print quality error has appeared in the first three images on the completely printed output roll 580, the operator may select only the first three images to be reprinted in the history roll queue area 520. Such a selection is shown in a user interface window 700 shown in FIG. 7. The roll 1 in the dynamic preview area 430 is changed accordingly. According to another embodiment the dynamic preview area 430 shows the entire roll 1 but indicates the selection in the dynamic preview area 430 by a color change, by dashing, or by another visually distinctive manner.

By selecting and/or deselecting rows in the history roll queue area 520 a first moment in time during printing the output roll 580 is determined by the first selected row. An image originally printed after this first moment in time is reprinted if the row corresponding to the image is selected. Also, by selecting and/or deselecting rows in the history roll queue area 520 a second moment in time during printing the output roll 580 is determined by the last selected row. An image originally printed before this second moment in time is reprinted if the row corresponding to the image is selected. Gaps in the selected rows may be envisioned, i.e. deselected rows in-between the first moment in time and the second moment in time are not executed. The reprint of the selected images takes place and also the selected events are carried out accordingly.

By deselecting an event in the history roll queue area 520, the operator may exclude the event saved in the roll file from execution during reprinting of the selected images.

Figure 8:
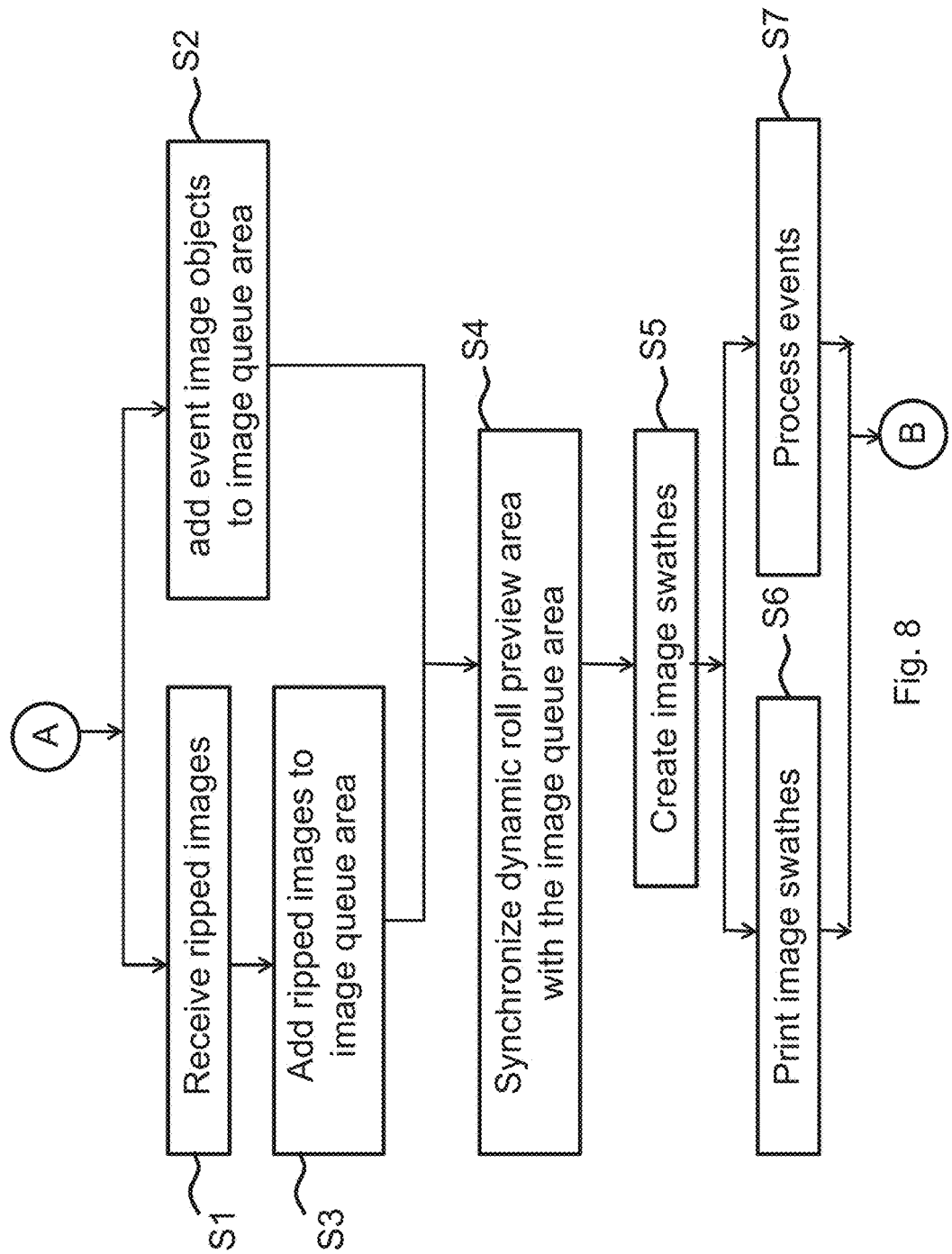
Figure 9:
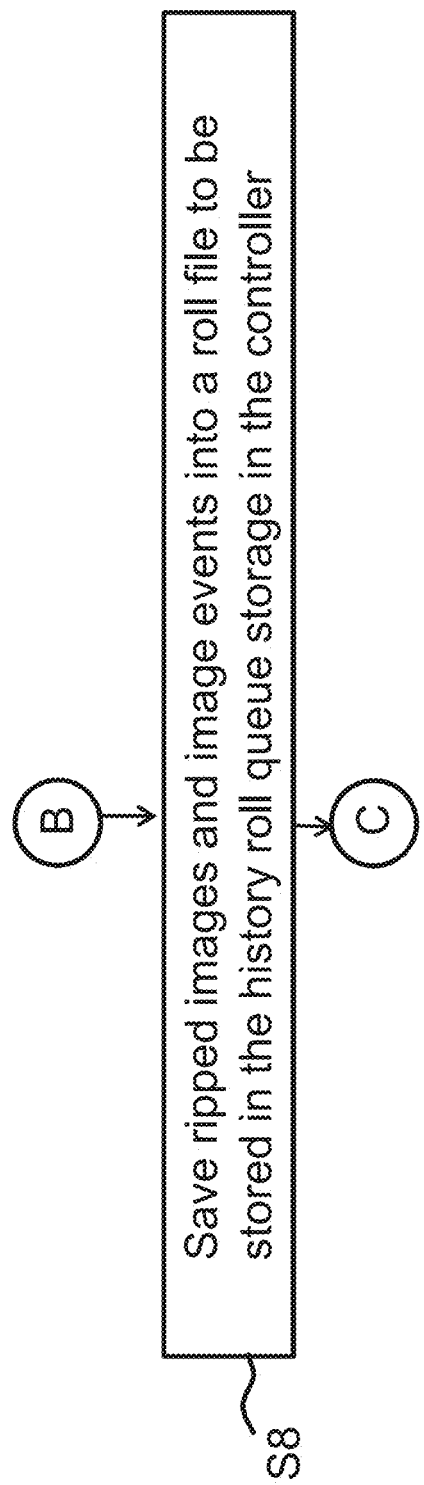

FIG. 8-9 show a schematic flow diagram illustrating a method according to the invention.

The method is suitable for controlling a roll-fed printing apparatus according to the invention.

The method starts in a starting point A and leads to a first step S1 and a second step S2. The first step S1 in combination with a third step S3, and the second step S2 may be executed in parallel or consecutively.

In the first step S1 the controller receives a plurality of ripped images from a raster image processor into memory of the roll managing system. The received ripped images are added to the print queue area 420 in FIG. 4. The roll managing system according to the invention displays and maintains the image queue area 420. The image queue area 420 comprises representations of the planned ripped images to be printed at an arbitrary position in an X direction and a Y direction on the at least one recording medium and representations of the ripped images currently being printed on the at least one recording medium.

In a second step S2 event image objects are added to the image queue area 420 in FIG. 4.

Each of the event image objects shown in the specification area 440 in FIG. 4 is manually or automatically placeable in the image queue area 420. The image queue area 420 is configured to receive an event image object of the plurality of event image objects between the representations of the planned ripped images to be printed on the least one recording medium in the image queue area. An event image object may represent an event which changes a lay-out of the printed ripped images.

In the third step digital representations of the ripped images are added to the image queue area 420 in FIG. 4.

In a fourth step S4 the dynamic roll preview area 430 is synchronized with the image queue area 420. The synchronization of these two areas 420, 430 may also take place during steps S1, S2, S3.

In a fifth step S5 the image swathes to be printed are created. For each ripped image the roll managing system establishes an arbitrary position in an X direction and a Y direction in the plane of the at least one recording medium at which arbitrary position the ripped image is intended to be printed. The arbitrary position may be determined by the order of the ripped images in the print queue, and may also be influenced by the operator dragging a representation of the ripped image in the dynamic roll preview area 430 in FIG. 4. In a third step S3 the controller creates subsequent image swathes for printing the ripped images according to the established arbitrary positions of the ripped images. The controller creates subsequent image swathes for printing the ripped images according to the established arbitrary positions of the ripped images.

A sixth step S6 and a seventh step S7 are executed in parallel according to a sequence order of the ripped images and the event image objects in the image queue area 420.

In the sixth step S6 the print engine subsequently prints the created subsequent image swathes.

In the seventh step S7 the controller executes the event related to the event image objects added to the image queue area 420 in the second step S2. The controller sets for an event image object of the plurality of the event image objects at least one printing and/or finishing command to be executed by the printing apparatus in accordance with a timing sequence of printing of the ripped images displayed in the image queue area 420.

The method proceeds to an intermediate point B shown in FIG. 8 and in FIG. 9.

The method proceeds to an eighth step S8.

In the eighth step S8 a part of the image queue, the part comprising the ripped images at the established arbitrary positions in an X direction and a Y direction on the roll of medium and the events according to plurality of event image objects placed in the image queue are saved into a roll file to be stored in the history roll queue storage 16 of the controller.

FIG. 10 shows that the method includes the following further steps starting from a second starting point D.

The second starting point D leads to a ninth step S9.

Figure 7:
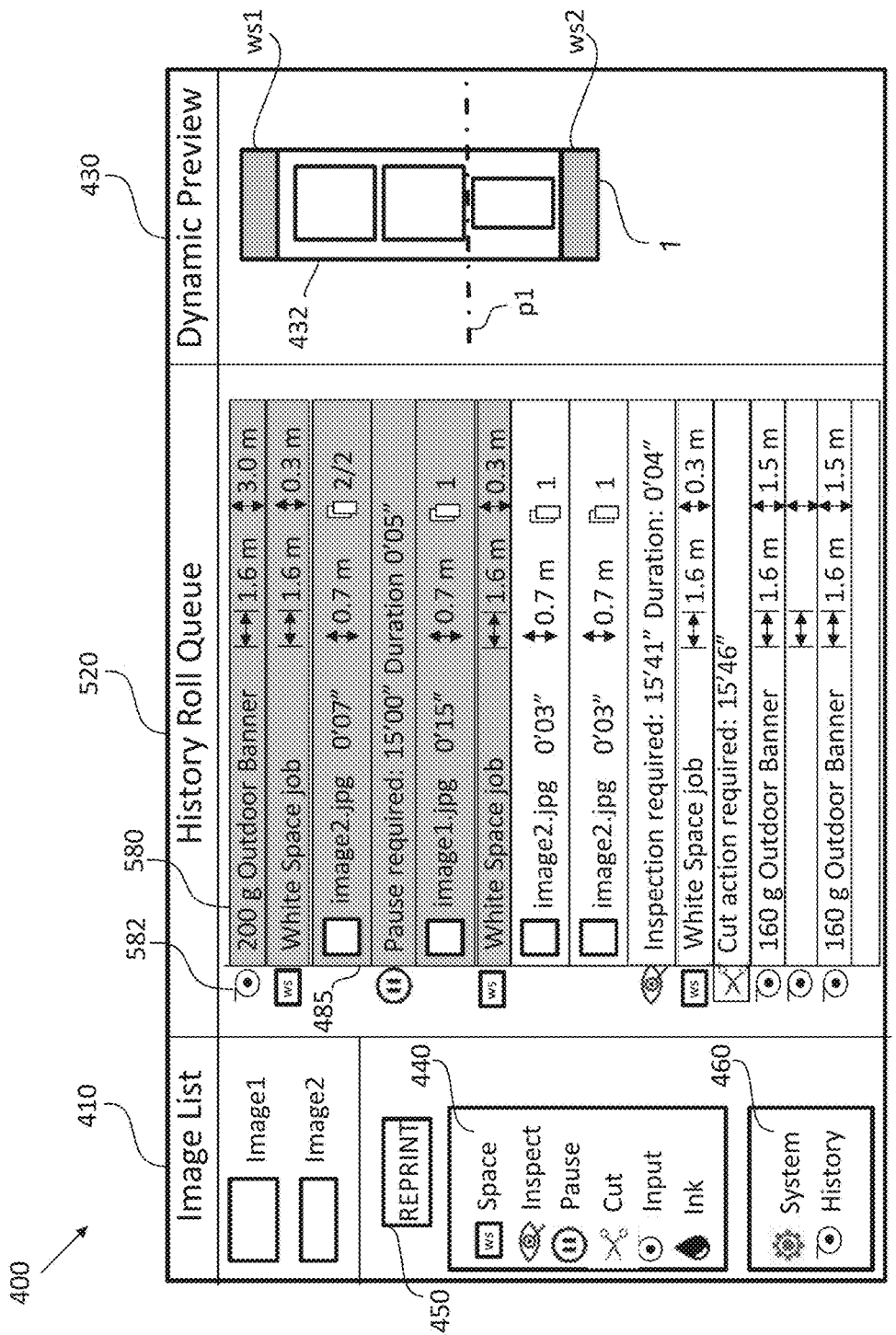

In the ninth step S9 it is checked if a reprint request for a printed output roll has been received by the controller. Such a reprint request for the printed output roll may be invoked by selecting a completely printed output roll from the history roll queue area 520 in FIG. 5 and afterwards activating the "REPRINT" button 450 shown in FIG. 5. Before, activating the "REPRINT" button 450 ripped images and events which have been processed during the first time printing of the output roll may be selected and/or deselected as shown in FIG. 6-7.

If a reprint request is received, the method proceeds to a tenth step S10. If not, the method ends in an endpoint E.

In the tenth step S10 at least part of the ripped images and events saved in the roll file, i.e. ripped images and events selected in the history roll queue area 520 are retrieved from the history roll queue storage 16.

In an eleventh step S11 the at least part of the ripped images is reprinted. Parallel to the eleventh step S11, in a twelfth step S12, according to the sequence order in the history roll queue area 520 the selected events are processed.

The method ends in an endpoint E.

FIG. 11 schematically shows a non-transitory software medium 90 according to the invention. The software medium 90 comprises executable code 92 configured to, when executed, perform the method of the first aspect, e.g. as described with respect to either the roll-fed printing apparatus 100, 200 or the method of controlling the roll-fed printing apparatus 100, 200 according to any or all of the FIG. 1 to 10 and/or according to any of the variants and modifications of the roll-fed printing apparatus 100, 200 and/or of the method described here-above.

The software medium may, specifically, be formed as a CD or a CD-ROM, a DVD or a DVD-ROM, a BluRay disc or a BluRay-ROM disc, a magnetic hard drive, a solid state disk (SSD) hard drive, a USB memory device and so on.

While detailed embodiments of the present invention are disclosed herein, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. In particular, features presented and described in separate dependent claims may be applied in combination and any advantageous combination of such claims are herewith disclosed.

Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language).

It will be evident that the described embodiments may be varied in many ways. All such modifications as would be evident to one skilled in the art starting from what is explicitly described are intended to be included.

The invention claimed is:

1. A method for controlling a roll-fed printing apparatus for printing images on a roll of recording medium having an arbitrary roll width, the roll-fed apparatus comprising a print engine, a controller comprising a roll managing system for managing the printing of ripped images on the roll of recording medium, the method comprising the steps of
   a) the controller receiving a plurality of ripped images from a raster image processor into memory of the roll managing system,
   b) for each ripped image the roll managing system establishing an arbitrary position in an X direction and a Y direction of the plane of the recording medium of the roll at which arbitrary position the ripped image is intended to be printed,
   c) the controller creating subsequent image swathes for printing the ripped images according to the established arbitrary positions of the ripped images,
   d) the roll managing system displaying and maintaining an image queue area comprising representations of the planned ripped images to be printed on the roll of recording medium and representations of the ripped images currently being printed on the roll of recording medium,
   e) the roll managing system providing a plurality of event image objects which are placeable in the image queue area and the image queue area is configured to receive an event image object of the plurality of event image objects between the representations of the planned ripped images to be printed on the roll of recording medium in the image queue area, and
   f) the controller setting for an event image object of the plurality at least one printing and/or finishing command to be executed by the printing apparatus in accordance with a timing sequence of printing of the ripped images displayed in the image queue area,
   g) the print engine subsequently printing the created subsequent image swathes and executing the events according to the set at least one printing and/or finishing command,
   wherein the method comprises the steps of
   h) saving a part of the image queue, the part comprising the ripped images at the established arbitrary positions in an X direction and a Y direction on the roll of medium and the events according to plurality of event image objects placed in the image queue into a roll file to be stored in a history roll queue storage of the controller, and
   i) reprinting at least part of the ripped images saved in the roll file on a new roll of medium having a same roll width as the arbitrary roll width according to a sequence order and the arbitrary positions saved in the roll file, and
   j) during reprinting, executing the corresponding events saved in the roll file.

2. The method of claim 1, wherein the method comprises a step of determining a first moment in time during printing the roll of recording medium, and establishing the at least part of the ripped images intended to be reprinted to be ripped images which have been printed on the roll of recording medium from the first moment in time.

3. The method according to claim 2, wherein the method comprises the steps of manually scrolling through the digital representations of the ripped images of the dynamic roll preview area or the image queue area, and simultaneously automatically scrolling through the corresponding digital representations of the ripped images in the image queue area or the dynamic roll preview area respectively, while both scrolling steps are used to determine the first moment in time.

4. The method according to claim 3, wherein the method comprises the steps of manually selecting a digital representation of a ripped image in the dynamic roll preview area or the image queue area, and simultaneously automatically selecting a corresponding digital representation of the ripped image in the image queue area or the dynamic roll preview area respectively, while both selecting steps are used to determine the first moment in time.

5. The method according to claim 1, wherein the method comprises a step of determining a second moment in time during printing the roll of recording medium, and establishing the at least part of the ripped images intended to be reprinted to be ripped images which have been printed on the roll of recording medium until the second moment in time.

6. The method according to claim 5, wherein the method comprises the steps of manually scrolling through the digital representations of the ripped images of the dynamic roll preview area or the image queue area, and simultaneously automatically scrolling through the corresponding digital representations of the ripped images in the image queue area or the dynamic roll preview area respectively, while both scrolling steps are used to determine the second moment in time.

7. The method according to claim 6, wherein the method comprises the steps of manually selecting a digital representation of a ripped image in the dynamic roll preview area or the image queue area, and simultaneously automatically selecting a corresponding digital representation of the ripped image in the image queue area or the dynamic roll preview area respectively, while both selecting steps are used to determine the second moment in time.

8. The method according to claim 1, wherein the event image object represents one out of an unprinted space event, an inspection moment, a print pause, a roll change, a maintenance action and a finishing action.

9. The method according to claim 1, wherein the method comprises the steps of the roll managing system displaying and maintaining a dynamic roll preview area comprising a digital representation of the roll of recording medium, digital representations of the planned ripped images to be printed on the roll of recording medium, digital representations of the ripped images currently being printed on the roll of recording medium, and digital representations of each event image object placed in the image queue area, and
the roll managing system continuously synchronizing the dynamic roll preview area with the image queue area.

10. The method according to claim 1, wherein the method comprises the step of excluding at least one event saved in the roll file from execution during reprinting of the at least part of the ripped images saved in the roll file.

11. A roll-fed printing apparatus for printing images on a roll of recording medium having an arbitrary roll width, the roll-fed apparatus comprising a print engine and a controller comprising a roll managing system for managing the printing of ripped images on the roll of recording medium, the controller being configured to control a print queue comprising the ripped images to be printed,
wherein the controller is configured
to receive a plurality of ripped images from a raster image processor into memory of the roll managing system,
the roll managing system is configured
to establish for each ripped image an arbitrary position in an X direction and a Y direction of the plane of the roll of recording medium at which arbitrary position the ripped image is intended to be printed,
the controller is configured
to create subsequent image swathes for printing the ripped images according to the established arbitrary positions of the ripped images,
the print engine is configured
to subsequently print the created subsequent image swathes, and
the roll managing system is configured
to display and maintain an image queue area comprising the planned ripped images to be printed on the at least one recording medium and the ripped images currently being printed on the roll of recording medium, and
to provide a plurality of event image objects which are placeable in the image queue area and the image queue area is configured to receive an event image object of the plurality of event image objects between the planned ripped images to be printed on the roll of recording medium in the image queue area,
the controller is configured
to set for an event image object of the plurality at least one printing and/or finishing command to be executed by the printing apparatus in accordance with a timing sequence of printing of the print jobs displayed in the image queue area,
wherein
the controller comprises a history roll queue storage being configured to save a part of the image queue, the part comprising the ripped images at the established arbitrary positions in an X direction and a Y direction on the roll of recording medium and the events according to plurality of event image objects placed in the image queue into a roll file in order to facilitate a reprinting of at least part of the ripped images saved in the roll file on a new roll of medium having a same roll width as the arbitrary roll width according to a sequence order and the arbitrary positions saved in the roll file, and, during reprinting, an execution of the corresponding events saved in the roll file.

12. A non-transitory software medium comprising executable code configured to, when executed, perform the method according to claim 1.

* * * * *